United States Patent
Seidel et al.

(10) Patent No.: US 10,392,506 B2
(45) Date of Patent: *Aug. 27, 2019

(54) POLYCARBONATE COMPOSITIONS FOR GALVANIC APPLICATIONS HAVING A HIGH REQUIREMENT FOR HEAT DISTORTION POINT

(71) Applicant: Covestro Deutschland AG, Leverkusen (DE)

(72) Inventors: Andreas Seidel, Dormagen (DE); Wolfgang Schwartmann, Solingen (DE); Eckhard Wenz, Köln (DE); Peter Weimar, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/742,138

(22) PCT Filed: Jul. 4, 2016

(86) PCT No.: PCT/EP2016/065675
§ 371 (c)(1),
(2) Date: Jan. 5, 2018

(87) PCT Pub. No.: WO2017/005682
PCT Pub. Date: Jan. 12, 2017

(65) Prior Publication Data
US 2018/0194940 A1    Jul. 12, 2018

(30) Foreign Application Priority Data
Jul. 6, 2015 (EP) .................... 15175422

(51) Int. Cl.
| | | |
|---|---|---|
| *C08L 69/00* | (2006.01) | |
| *B32B 27/36* | (2006.01) | |
| *B32B 15/09* | (2006.01) | |
| *B32B 15/082* | (2006.01) | |
| *C23C 18/16* | (2006.01) | |
| *C08K 5/00* | (2006.01) | |
| *C08L 51/04* | (2006.01) | |
| *C08L 55/02* | (2006.01) | |

(52) U.S. Cl.
CPC .......... *C08L 69/00* (2013.01); *B32B 15/082* (2013.01); *B32B 15/09* (2013.01); *B32B 27/365* (2013.01); *C08K 5/0066* (2013.01); *C08L 51/04* (2013.01); *C08L 55/02* (2013.01); *C23C 18/1641* (2013.01); *C08L 2201/02* (2013.01); *C08L 2201/08* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 4,937,285 A | * | 6/1990 | Wittmann | ............... C08L 69/00 525/64 |
| 5,104,945 A | | 4/1992 | Eckel et al. | |
| 5,126,404 A | | 6/1992 | Eckel et al. | |
| 5,132,154 A | | 7/1992 | Westeppe et al. | |
| 5,137,970 A | | 8/1992 | Eckel et al. | |
| 5,145,911 A | | 9/1992 | Eckel et al. | |
| 5,846,665 A | * | 12/1998 | Timmer | ............. C23C 18/1641 428/626 |
| 6,838,502 B1 | * | 1/2005 | Nodera | ................... C08L 69/00 523/201 |
| 2011/0060106 A1 | | 3/2011 | de Kraker et al. | |
| 2013/0116367 A1 | * | 5/2013 | Seidel | ...................... C08K 3/24 524/151 |
| 2017/0029618 A1 | * | 2/2017 | Grieshaber | ............. C08L 69/00 |
| 2017/0362731 A1 | * | 12/2017 | Wang | ..................... C08L 69/00 |
| 2018/0215915 A1 | * | 8/2018 | Seidel | ..................... C08L 69/00 |

FOREIGN PATENT DOCUMENTS

| | | | |
|---|---|---|---|
| CA | 2037182 | * | 9/1991 |
| CN | 102146203 A | | 8/2011 |
| DE | 1031512 B | | 6/1958 |
| DE | 3832396 | * | 2/1990 |
| DE | 3832396 A1 | | 2/1990 |
| DE | 3913114 A1 | | 10/1990 |
| DE | 3914946 A1 | | 11/1990 |
| DE | 3918406 A1 | | 12/1990 |
| DE | 3919043 A1 | | 12/1990 |
| DE | 102008047833 A1 | | 5/2009 |
| EP | 0000146 A1 | | 1/1979 |
| EP | 0401629 A2 | | 12/1990 |
| EP | 0183167 B1 | | 1/1991 |
| EP | 503551 | * | 9/1992 |
| WO | WO-2013115903 A1 | | 8/2013 |

OTHER PUBLICATIONS

Schnell, Chemistry and Physics of Polycarbonates, (1964) pp. 68,69. (Year: 1964).*
International Search Report for PCT/EP2016/065675 dated Sep. 12, 2016. Written Opinion of the International Searching Authority for PCT/EP2016/065667 mailed.
Written Opinion of the International Searching Authority for PCT/EP2016/065675 dated Sep. 12, 2016.

* cited by examiner

*Primary Examiner* — David J Buttner
(74) *Attorney, Agent, or Firm* — Drinker Biddle & Reath LLP

(57) ABSTRACT

The invention relates to compositions consisting of A) 70 to 90 parts by weight of at least one polycarbonate, B) 10 to 30 parts by weight of at least one graft polymer containing a rubber-elastic particulate graft base, which contains diene, and containing a vinyl co(polymer) shell, C) 0 to 15 parts by weight of at least one additive, wherein the sum of the parts by weight of components A) and B) in the composition is normalized to 100. The invention further relates to the use of the compositions to produce components containing a plastic carrier and a multi-ply metal layer, and to molded bodies produced from the compositions.

15 Claims, No Drawings

POLYCARBONATE COMPOSITIONS FOR GALVANIC APPLICATIONS HAVING A HIGH REQUIREMENT FOR HEAT DISTORTION POINT

CROSS-REFERENCE TO RELATED APPLICATIONS

This application is a national stage application (under 35 U.S.C. § 371) of PCT/EP2016/065675, filed Jul. 4, 2016, which claims benefit of European Application No. 15175422.3, filed Jul. 6, 2015, both of which are incorporated herein by reference in their entirety.

The invention relates to polycarbonate compositions having good processing behavior in injection molding, good toughness and high heat distortion resistance which are galvanizable by the processes known and industrially established for ABS and ABS+PC compositions, wherein the thus galvanized component parts exhibit a good adhesion of multi-ply metal layer to substrate (i.e. plastics carrier) even at a high use temperatures and severe temperature variations.

Galvanizing of ABS and ABS-polycarbonate compositions is known from the literature.

Mariola Brandes, "The new generation of Futuron—A direct metallisation process for plastics with low Pd content" Galvanotecnica e Nuove Finiture (2003), 13(2), 100-102 discloses for example a process for galvanizing ABS and ABS+PC compositions.

Mariola Brandes, "Direct metalizing of ABS and ABS/PC with increased PC content", Galvanotechnik (2007), 98(4), 872-875 discloses an improved process which for the first time allows metallizing of polycarbonate-ABS molding materials comprising up to 65 wt % of polycarbonate. It was previously only possible to galvanize compositions having a polycarbonate content of not more than 45 wt %.

DE102008047833 (A1) discloses that ABS and ABS/PC are coatable and in particular chromable by means of known methods of plastics galvanizing while polycarbonate by contrast is inert under the conditions of customary plastics galvanizing and does not accept a coating.

WO 2013/115903 A1 discloses galvanizable PC+ABS compositions having an elevated polycarbonate fraction and having improved adhesion of the metal layer to the plastics substrate comprising 40 to 75 wt % of polycarbonate, 24 to 53 wt % of a first impact modifier and 1 to 7 wt % of a second impact modifier.

CN 102146203 A discloses PC+ABS blends having improved galvanizability and good mechanical properties, good heat resistance and good processability in injection molding comprising 20 to 70 wt % of polycarbonate, 20 to 75 wt % of ABS, 2-10 wt % of rubber-rich butadiene-based graft polymer, 0.2 to 0.5 wt % of calcium carbonate, 0 to 1 wt % of antioxidant and 0 to 1 wt % of lubricant.

EP 0 183 167 B1 discloses PC+ABS compositions having excellent heat distortion resistance, toughness and processability in the injection molding process and featuring improved galvanizability which comprise 10 to 90 wt % of aromatic polycarbonate, 10 to 90 wt % of a multi-shell, rubber-based graft polymer and optionally up to 60 wt % of a vinyl copolymer.

However, the ABS-polycarbonate and polycarbonate-ABS compositions suitable for galvanizing recited in this prior art have a heat distortion resistance too low for specific fields of application and galvanized component parts produced therefrom thus have a maximum use temperature too low for these fields of application.

Examples of such specific fields of application for galvanized components having increased heat distortion resistance requirements are (decorative) parts of automobiles (in particular under-hood applications or applications in the exhaust gas stream region), electrically operated devices (for example fan heaters, toasters, water heaters/hot water machines, coffee machines, hairdryers, ovens etc.), household objects subject to high temperatures or parts thereof (for example handles of cooking pots, pressure cookers or grills), parts of solar collectors and light reflectors and also functional elements for targeted removal of heat. These exemplary fields of application have in common that the component parts are subject to high temperatures because they are used in spatial proximity to heat sources (for example engines, electrically operated heating apparatuses, hot gas streams, focused incident light) and are also intentionally exposed to large temperature variations. Under these extreme conditions of use the galvanized component parts are intended to remain dimensionally stable and show sufficient adhesion of the metal layer to the plastics substrate and a stable surface appearance. Temperature changes must in particular not bring about any blister-shaped, let alone large-area, metal detachments.

Compositions having increased heat distortion resistance compared to polycarbonate molding materials where the polycarbonate is based only on bisphenol A units are likewise known from the literature.

US 2011 0060106 A1 discloses polycarbonate compositions having improved heat resistance, low-temperature toughness and flowability comprising polycarbonate based on n-phenylphenolphthalein (PPPBP) repeating units, a second polycarbonate distinct therefrom and an impact modifier.

DE 38 32 396 A1 discloses polycarbonates based on dihydroxydiphenylcycloalkanes having an elevated glass transition temperature.

DE 39 19 043 A1 discloses polycarbonate compositions having improved heat distortion resistance and good toughness comprising polycarbonate based on substituted dihydroxydiphenylcycloalkane, polycarbonate based on for example bisphenol-A and a rubber-modified graft polymer.

DE 39 13 114 A1 discloses polycarbonate compositions having improved heat distortion resistance and good toughness comprising polycarbonate based on substituted dihydroxydiphenylcycloalkane, polycarbonate based on for example bisphenol-A and a silicone-rubber-modified graft polymer.

DE 39 14 946 A1 discloses polycarbonate compositions having high heat distortion resistance and improved notched impact strength and stress cracking resistance under chemicals exposure comprising polycarbonate based on substituted dihydroxyphenylcycloalkane, rubber-based graft polymer and optionally at least one further thermoplastic resin.

EP 0 401 629 A2 discloses polycarbonate compositions having improved heat distortion resistance and good toughness comprising polycarbonate based on substituted dihydroxydiphenylcycloalkane, vinyl copolymer and rubber-based graft polymer.

However, it is not possible to derive any indications whatsoever from the recited applications concerning the galvanizability of these polycarbonate compositions having improved heat distortion resistance and, accordingly, no information regarding adhesion of a multi-ply metal layer applied by a galvanizing process to the substrate (i.e. plastics carrier), in particular at high use temperature and severe temperature variations, is disclosed either.

It is accordingly an object of the present invention to provide compositions which not only feature good processing characteristics in injection molding (i.e. good melt flowability), high toughness and improved heat distortion resistance as measured by a Vicat B/120 according to ISO 306 (2013 version) of at least 135° C., preferably at least 140° C., but also feature good galvanizability preferably in a process known and industrially established for ABS and ABS+PC compositions and are suitable for producing galvanized component parts. These component parts shall feature satisfactory adhesion of the multi-ply metal layer to the plastics carrier and withstand varying use temperatures in the range from room temperature to preferably at least 135° C., particularly preferably to at least 140° C., without deforming or changing in visual constitution in any other way, i.e. in particular without detachment of the multi-ply metal layer from the plastics carrier which may manifest for example in a blister formation.

A sufficient adhesion of the multi-ply metal layer to the plastics carrier is generally taken to mean a value of at least 0.20 N/mm measured in the roller peel test according to DIN 53494 (1984 version).

It has been found that, surprisingly, the object of the invention is achieved by compositions consisting of
A) 70 to 90 parts by weight, preferably 75 to 87 parts by weight, more preferably 80 to 85 parts by weight, of at least one polycarbonate,
B) 10 to 30 parts by weight, preferably 13 to 25 parts by weight, more preferably 15 to 20 parts by weight, of at least one graft polymer comprising a diene-containing elastomeric particulate graft base and a vinyl (co)polymer sheath,
C) 0 to 15 parts by weight, preferably 0.1 to 5 parts by weight, particularly preferably 0.2 to 3 parts by weight, of at least one additive,
wherein the sum of the parts by weight of components A) and B) in the composition is normalized to 100,
(i) characterized in that the rubber content from component 13 in the composition is at least 6 wt %, preferably at least 7 wt %, particularly preferably at least 9 wt %,
(ii) characterized in that the ratio K/S of the weight fractions of diene-containing elastomeric particulate graft base from component B) in the composition (=K) to the sum of free, i.e. not covalently bonded to the rubber base in the graft polymer according to component B), vinyl (co)polymer from component B) and any free vinyl (co)polymer from component C) in the composition (=S) is at least 1.5, preferably at least 1.8, particularly preferably at least 2.1,
(iii) characterized in that component A) comprises at least one monomer unit selected from the group consisting of monomer units described by general formula (2)

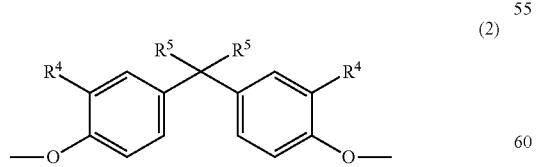

(2)

in which
$R^4$ represents H, linear or branched $C_1$-$C_{10}$ alkyl, preferably linear or branched $C_1$-$C_6$ alkyl, particularly preferably linear or branched $C_1$-$C_4$ alkyl, very particularly preferably H or $C_1$-alkyl (methyl), and $R^5$ represents linear or branched $C_1$-$C_{10}$ alkyl, preferably linear or branched $C_1$-$C_6$ alkyl, particularly preferably linear or branched $C_1$-$C_4$ alkyl, very particularly preferably $C_1$-alkyl (methyl), and at least one monomer unit derived from a bis(4-hydroxyphenyl) compound and bridged via the 1,1'-position of a cyclic hydrocarbon optionally substituted with heteroatoms, preferably a monomer unit bridged via the 1,1'-position of a cyclic hydrocarbon and described by any of general formulae (1a), (1b), (1c) and (1d), particularly preferably a monomer unit bridged via the 1,1'-position of a cyclic hydrocarbon and described by general formula (1a)

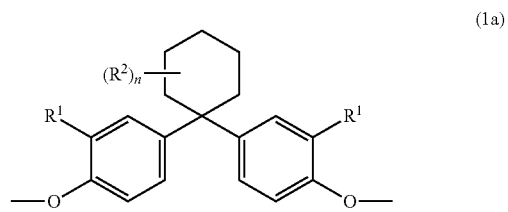

(1a)

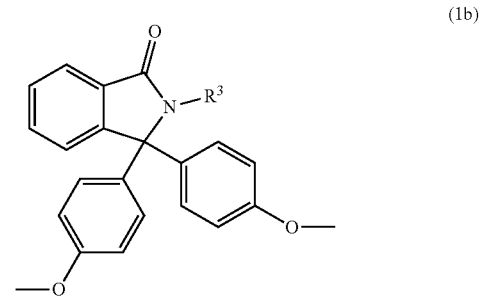

(1b)

(1c)

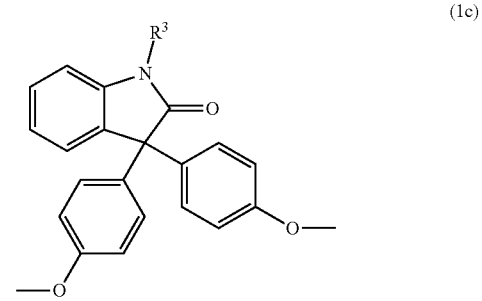

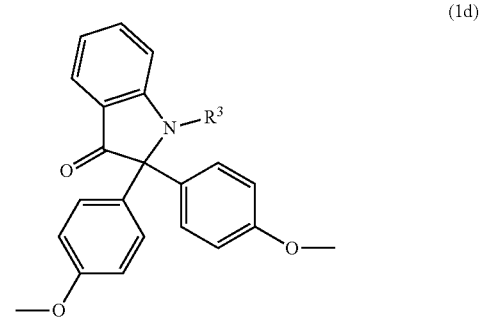

(1d)

in which
$R^1$ represents hydrogen or $C_1$-$C_4$-alkyl, preferably hydrogen,
$R^2$ represents $C_1$-$C_4$-alkyl, preferably methyl,
n represents 0, 1, 2 or 3, preferably 3, and
$R^3$ represents $C_1$-$C_4$-alkyl, aralkyl or aryl, preferably methyl or phenyl, very particularly preferably phenyl, (iv) characterized in that the proportion ($A_{cyc}$) of monomer units derived from bis(4-hydroxyphenyl) compounds and bridged via the 1,1'-position of a cyclic hydrocarbon optionally substituted with heteroatoms based on the sum of all monomer units derived from bisphenols in component A) is in the range from 5 to 40 wt %, preferably in the range from 8 to 37 wt %, particularly preferably in the range from 10 to 35 wt %, (v) characterized in that component A) has a relative solution viscosity of 1.20 to 1.28, preferably of 1.21 to 1.27, particularly preferably of 1.22 to 1.26, determined according to DIN 51562 in methylene chloride.

As the monomer unit in component A) bridged via the 1,1'-position of a cyclic hydrocarbon optionally substituted with heteroatoms it is preferable to employ at least one representative, particularly preferably precisely one representative, selected from the group consisting of 1,1-bis(4-hydroxyphenyl)-3,3',5-trimethylcyclohexane (Bisphenol-TMC) and 2-phenyl-3,3'-bis(4-hydroxyphenyl)phthalimide (PPPBP).

Having regard to the mechanical properties, in particular the notched impact strength, of the molding materials produced from these compositions, compositions employing 1,1-bis(4-hydroxyphenyl)-3,3',5-trimethylcyclohexane (Bisphenol TMC) as the monomer unit in component A) bridged via the 1,1'-position of a cyclic hydrocarbon optionally substituted with heteroatoms have proven particularly advantageous and thus preferred.

In terms of the rubber content from component B in the composition the upper limit $K_{max}$ is specified merely by the proportion of component B and the rubber fraction B.2 in component B via the formula $K_{max}=B \cdot B..2$.

In terms of the ratio K/S there is no upper limit since it is in principle advantageous to minimize the proportion of S. In preferred embodiments component C therefore comprises no free (i.e. not chemically bonded to a rubber base) vinyl (co)polymer. Also preferable therefore is the use of a component B having a highest possible gel content of at least 70 wt %, particularly preferably at least 75 wt %, very particularly preferably at least 80 wt %.

In preferred embodiments the graft polymer used according to component B) is a graft polymer based on a diene-containing elastomeric particulate graft base, characterized in that the proportion of the rubber particles in the graft base having a diameter of <200 nm is at least 10 wt %, preferably at least 20 wt %.

In a further preferred embodiment the content of free vinyl (co)polymer in the composition (sum from component B and component C) is less than 7 wt %, particularly preferably less than 6 wt %, in particular less than 5 wt %.

The compositions according to the invention exhibit a notched impact strength measured according to ISO 180/1A (1982 version) at room temperature of at least 20 kJ/m², preferably of at least 30 kJ/m².

A further aspect of the present invention is the use of the previously described molding materials for producing galvanized component parts as described above.

Preferred embodiments 1 to 23 of the present invention are described below:

1.) Compositions consisting of
A) 70 to 90 parts by weight of at least one polycarbonate,
B) 10 to 30 parts by weight of at least one graft polymer comprising a diene-containing elastomeric particulate graft base and a vinyl (co)polymer sheath,
C) 0 to 15 parts by weight of at least one additive,
   wherein the sum of the parts by weight of components A) and B) in the composition is normalized to 100,
   (i) characterized in that the rubber content from component 13 in the composition is at least 6 wt %,
   (ii) characterized in that the ratio K/S of the weight fractions of diene-containing elastomeric particulate graft base from component B) in the composition (=K) to the sum of free, i.e. not covalently bonded to the rubber base in the graft polymer according to component B), vinyl (co)polymer from component B) and any free vinyl (co)polymer from component C) in the composition (=S) is at least 1.5,
   (iii) characterized in that component A) comprises at least one monomer unit selected from the group consisting of monomer units described by general formula (2)

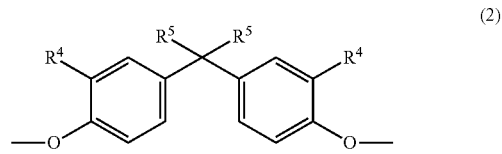

in which
$R^4$ represents H, linear or branched $C_1$-$C_{10}$ alkyl, preferably linear or branched $C_1$-$C_6$ alkyl, particularly preferably linear or branched $C_1$-$C_4$ alkyl, very particularly preferably H or $C_1$-alkyl (methyl), and
$R^5$ represents linear or branched $C_1$-$C_{10}$ alkyl, preferably linear or branched $C_1$-$C_6$ alkyl, particularly preferably linear or branched $C_1$-$C_4$ alkyl, very particularly preferably $C_1$-alkyl (methyl), and at least one monomer unit derived from a bis(4-hydroxyphenyl) compound and bridged via the 1,1'-position of a cyclic hydrocarbon optionally substituted with heteroatoms,
   (iv) characterized in that the proportion ($A_{cyc}$) of monomer units derived from bis(4-hydroxyphenyl) compounds and bridged via the 1,1'-position of a cyclic hydrocarbon optionally substituted with heteroatoms based on the sum of all monomer units derived from bisphenols in component A) is in the range rom 5 to 40 wt % and
   (v) characterized in that component A) has a relative solution viscosity of 1.20 to 1.28 determined according to DIN 51562 in methylene chloride.

2.) Composition according to embodiment 1, consisting of
A) 80 to 85 parts by weight of at least one aromatic polycarbonate,
B) 15 to 20 parts by weight of at least one graft polymer comprising a diene-containing elastomeric particulate graft base and a vinyl (co)polymer sheath,
C) 0.2 to 3 parts by weight of at least one additive,
   wherein the sum of the parts by weight of components A) and B) in the composition is normalized to 100.

3.) Composition according to embodiment 1 or 2, characterized in that as component C one or more additives selected from the group consisting of flame retardants, anti-drip agents, flame retardant synergists, smoke inhibitors, lubricants and demolding agents, nucleating agents, antistats, conductivity additives, stabilizers, flow promoters, compatibilizers, further impact modifiers distinct from component B, further polymeric constituents, fillers and reinforcers and also dyes and pigments are employed.

4.) Composition according to any of the preceding embodiments, characterized in that the rubber content from component B in the composition is at least 9 wt %.

5.) Composition according to any of the preceding embodiments, characterized in that the ratio K/S is at least 2.1.

6.) Composition according to any of the preceding embodiments, characterized in that $A_{cyc}$ is between 10 and 35 wt %.

7.) Composition according to any of the preceding embodiments, characterized in that the monomer units derived from bis(4-hydroxyphenyl) compounds and bridged via the 1,1'-position of a cyclic hydrocarbon optionally substituted with heteroatoms are selected from the structures described by the formulae

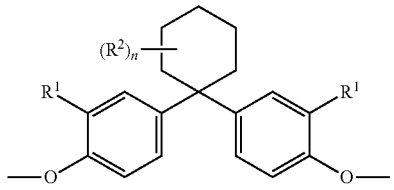

(1a)

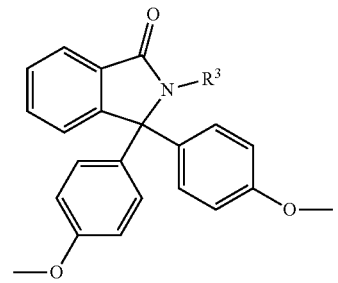

(1b)

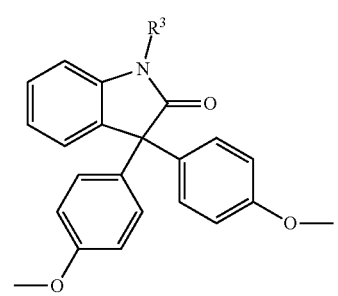

(1c)

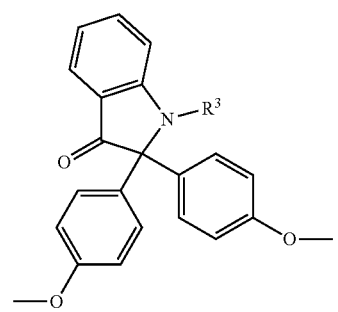

(1d)

in which
$R^1$ represents hydrogen or $C_1$-$C_4$-alkyl,
$R^2$ represents $C_1$-$C_4$-alkyl,
n represents 0, 1, 2 or 3 and
$R^3$ represents $C_1$-$C_4$-alkyl, aralkyl or aryl.

8.) Composition according to any of the preceding embodiments, characterized in that the monomer units derived from bis(4-hydroxyphenyl) compounds and bridged via the 1,1'-position of a cyclic hydrocarbon optionally substituted with heteroatoms are selected from the structures described by the formula (1a).

9.) Composition according to any of the preceding embodiments, characterized in that the monomer unit derived from bis(4-hydroxyphenyl) compounds and bridged via the 1,1'-position of a cyclic hydrocarbon optionally substituted with heteroatoms is 1,1-bis(4-hydroxyphenyl)-3,3',5-trimethylcyclohexane.

10.) Composition according to any of the preceding embodiments, characterized in that the relative solution viscosity of component A is in the range from 1.22 to 1.26.

11.) Composition according to any of the preceding embodiments, characterized in that when using copolycarbonates based on at least one monomer unit selected from the group characterized by general formula (1a) and at least one monomer unit selected from the group characterized by general formula (2) the relative solution viscosity of this copolymer employed in component A is in the range of 1.23-1.27.

12.) Composition according to any of the preceding embodiments, characterized in that when using homo- or copolycarbonates based on at least one monomer unit selected from the group characterized by general formula (2) which comprise no monomer units derived from bis(4-hydroxyphenyl) compounds and bridged via the 1,1'-position of a cyclic hydrocarbon optionally substituted with heteroatoms the relative solution viscosity of this homo- or copolymer employed in component A is in the range of 1.20-1.28.

13.) Composition according to any of the preceding embodiments, characterized in that the proportion of rubber particles in the graft base B.2 having a diameter of <200 nm is at least 20 wt %.

14.) Compositions according to any of the preceding embodiments, characterized in that the content of free vinyl (co)polymer in the composition (sum from component B and component C) is less than 7 wt %.

15.) Compositions according to any of the preceding embodiments, characterized in that the content of free vinyl (co)polymer in the composition (sum from component B and component C) is less than 5 wt %.

16.) Compositions according to any of the preceding embodiments, characterized in that they have a Vicat B/120 heat distortion resistance according to ISO 306-2013 version of at least 135° C.

17.) Compositions according to any of the preceding embodiments, characterized in that they have a notched impact strength measured according to ISO 180/1A—1982 version at room temperature of at least 20 kJ/m².

18.) Compositions consisting of
A) 75 to 87 parts by weight of at least one polycarbonate,
B) 13 to 25 parts by weight of at least one graft polymer comprising a diene-containing elastomeric particulate graft base and a vinyl (co)polymer sheath,
C) 0 to 15 parts by weight of at least one additive,
wherein the sum of the parts by weight of components A) and B) in the composition is normalized to 100,
  (i) characterized in that the rubber content from component B in the composition is at least 7 wt %,
  (ii) characterized in that the ratio K/S of the weight fractions of diene-containing elastomeric particulate graft base from component B) in the composition (=K) to the sum of free, i.e. not covalently bonded to the rubber base in the graft polymer according to component B), vinyl (co)polymer from component B) and any free vinyl (co)polymer from component C) in the composition (=S) is at least 1.8, (iii) characterized in that component A) comprises at least one monomer unit selected from the group consisting of monomer units described by general formula (2)

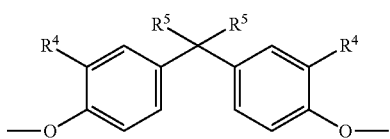

(2)

in which
R$^4$ represents H or C$_1$-alkyl (methyl) and
R$^5$ represents C$_1$-alkyl (methyl)
and at least one monomer unit derived from a bis(4-hydroxyphenyl) compound and bridged via the 1,1'-position of a cyclic hydrocarbon optionally substituted with heteroatoms and described by any of general formulae (1a), (b), (1c) and (1d)

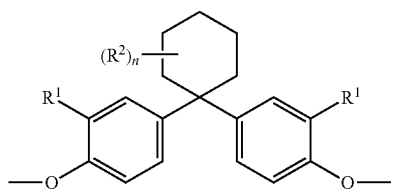

(1a)

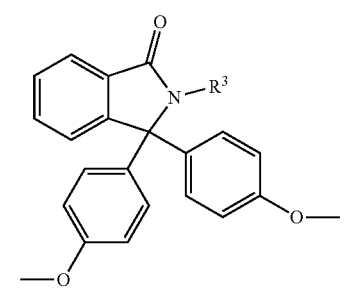

(1b)

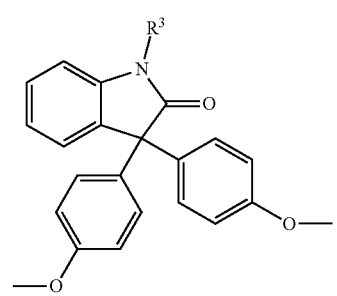

(1c)

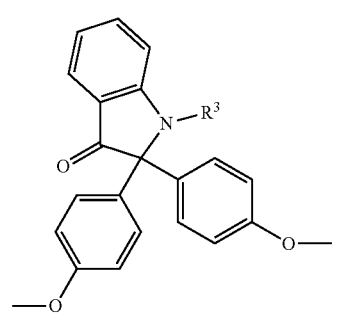

(1d)

in which
R$^1$ represents hydrogen or C$_1$-C$_4$-alkyl,
R$^2$ represents C$_1$-C$_4$-alkyl,
n represents 0, 1, 2 or 3 and
R$^3$ represents methyl or phenyl, (iv) characterized in that the proportion (A$_{cyc}$) of monomer units derived from bis(4-hydroxyphenyl) compounds and bridged via the 1,1'-position of a cyclic hydrocarbon optionally substituted with heteroatoms based on the sum of all monomer units derived from bisphenols in component A) is in the range from 8 to 37 wt %, (v) characterized in that component A) has a relative solution viscosity of 1.21 to 1.27, (vi) characterized in that as component C one or more additives selected from the group consisting of flame retardants, anti-drip agents, flame retardant synergists, smoke inhibitors, lubricants and demolding agents, nucleating agents, antistats, conductivity additives, stabilizers, flow promoters, compatibilizers, further impact modifiers distinct from component B, further polymeric constituents, fillers and reinforcers and also dyes and pigments are employed, (vii) characterized in that when using copolycarbonates based on at least one monomer unit selected from the group characterized by general formula (1a) and at least one monomer unit selected from the group characterized by general formula (2) the relative solution viscosity of this copolymer employed in component A, is in the range of 1.23-1.27 and (viii) characterized in that when using homo- or copolycarbonates based on at least one monomer unit selected from the group characterized by general formula (2) which comprise no monomer units derived from bis(4-hydroxyphenyl) compounds and bridged via the 1,1'-position of a cyclic hydrocarbon optionally substituted with heteroatoms the relative solution viscosity of this homo- or copolymer employed in component A is in the range of 1.20-1.28.

19.) Compositions according to embodiment 18, characterized in that in component A) as the monomer unit derived from a bis(4-hydroxyphenyl) compound and bridged via the 1,1'-position of a cyclic hydrocarbon optionally substituted with heteroatoms a compound of general formula (1a) is employed.

20.) Compositions according to embodiment 19, characterized in that the monomer unit derived from bis(4-hydroxyphenyl) compounds and bridged via the 1,1'-position of a cyclic hydrocarbon optionally substituted with heteroatoms is derived from 1,1-bis(4-hydroxyphenyl)-3,3',5-trimethylcyclohexane.

21.) Compositions according to any of the preceding embodiments, characterized in that they comprise pentaerythritol tetrastearate as a demolding agent, at least one representative selected from the group consisting of octadecyl 3-(3,5-di-tert-butyl-4-hydroxyphenyl)propionate and tris(2,4-di-tertbutylphenyl)phosphite as a stabilizer and optionally a Brønsted acid and the compositions are free from further polymer additives.

22.) Use of compositions of any of embodiments 1 to 21 for producing a component part comprising a plastics carrier and a multi-ply metal layer.

23.) Molded articles produced from any of the compositions according to embodiments 1 to 21.

Definitions

C$_1$-C$_4$-alkyl in the context of the invention represents for example methyl, ethyl, n-propyl, isopropyl, n-butyl, sec.-butyl, tert.-butyl, C$_1$-C$_6$-alkyl moreover represents for example n-pentyl, 1-methylbutyl, 2-methylbutyl, 3-methylbutyl, neo-pentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl, $C_1$-$C_{10}$-alkyl moreover represents for example n-heptyl and n-octyl, pinacyl, adamantyl, the isomeric menthyls, n-nonyl, n-decyl, $C_1$-$C_{34}$-alkyl moreover represents for example n-dodecyl, n-tridecyl, n-tetradecyl, n-hexadecyl or n-octadecyl. The same applies for the corresponding alkyl radical for example in aralkyl/alkylaryl, alkylphenyl or alkylcarbonyl radicals. Alkylene radicals in the corresponding hydroxyalkyl or aralkyl/alkylaryl radicals represent for example the alkylene radicals corresponding to the preceding alkyl radicals.

Aryl is a carbocyclic aromatic radical having 6 to 34 skeletal carbon atoms. The same applies for the aromatic part of an arylalkyl radical, also known as an aralkyl radical, and for aryl constituents of more complex groups, for example arylcarbonyl radicals.

Examples of $C_6$-$C_{34}$-aryl are phenyl, o-, p-, m-tolyl, naphthyl, phenanthrenyl, anthracenyl and fluorenyl.

Component A

The composition according to the invention comprises as component A at least one component part selected from the group consisting of homo- and copolycarbonates comprising one or more, preferably precisely one, monomer units derived from bis(4-hydroxyphenyl) compounds and bridged via the 1,1'-position of a cyclic hydrocarbon optionally substituted with heteroatoms, preferably monomer units bridged via the 1,1'-position of a cyclic hydrocarbon of general formulae (1a), (1b), (1c) and (1d) and optionally additionally monomer units of general formula (2)

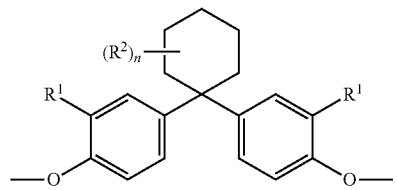
(1a)

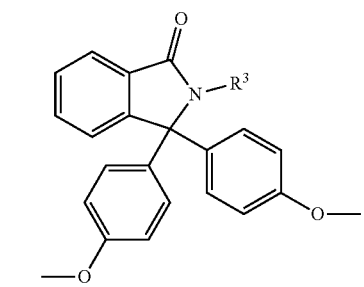
(1b)

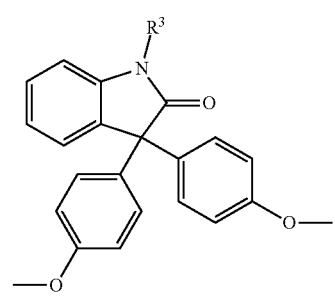
(1c)

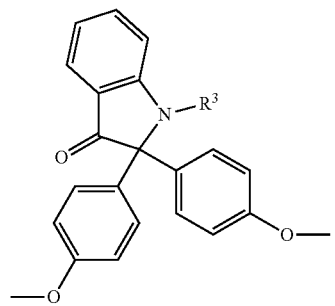
(1d)

in which
$R^1$ represents hydrogen or $C_1$-$C_4$-alkyl, preferably hydrogen,
$R^2$ represents $C_1$-$C_4$-alkyl, preferably methyl,
n represents 0, 1, 2 or 3, preferably 3, and
$R^3$ represents $C_1$-$C_4$-alkyl, aralkyl or aryl, preferably methyl or phenyl, very particularly preferably phenyl,

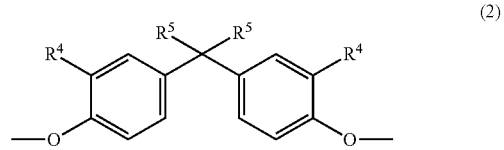
(2)

in which
$R^4$ represents H, linear or branched $C_1$-$C_{10}$ alkyl, preferably linear or branched $C_1$-$C_6$ alkyl, particularly preferably linear or branched $C_1$-$C_4$ alkyl, very particularly preferably H or $C_1$-alkyl (methyl), and
$R^5$ represents linear or branched $C_1$-$C_{10}$ alkyl, preferably linear or branched $C_1$-$C_6$ alkyl, particularly preferably linear or branched $C_1$-$C_4$ alkyl, very particularly preferably $C_1$-alkyl (methyl).

It is also possible to employ mixtures of different homo- and/or copolycarbonates from the abovementioned group as component A.

Component A may also comprise homo- and copolycarbonates comprising exclusively monomer units of general formula (2). Homopolycarbonate based on bisphenol A is preferably what is concerned here.

The monomer unit(s) of general formula (1a) is/are introduced via one or more corresponding diphenols of general formula (1a'):

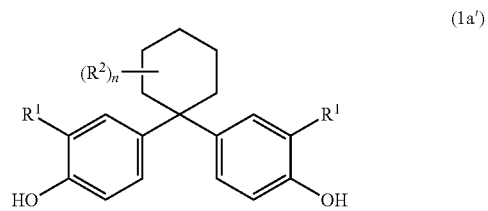
(1a')

in which
$R^1$ represents hydrogen or $C_1$-$C_4$-alkyl, preferably hydrogen,
$R^2$ represents $C_1$-$C_4$-alkyl, preferably methyl, and
n represents 0, 1, 2 or 3, preferably 3.

The diphenols of formulae (1a') to be employed in accordance with the invention and the employment thereof in homopolycarbonates are disclosed in DE 3918406 for example.

Particular preference is given to 1,1-bis-(4-hydroxyphenyl)-3,3,5-trimethylcyclohexane (Bisphenol TMC) having the formula (1a''):

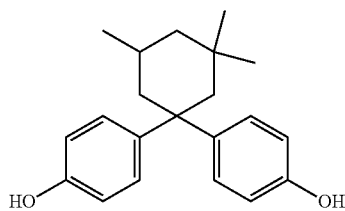

(1a'')

The monomer unit(s) of general formula (1b), (1c) and (1d) are introduced via one or more corresponding diphenols of general formulae (1b'), (1c') and (1d'):

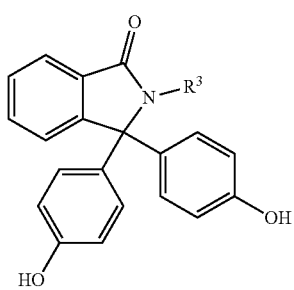

(1b')

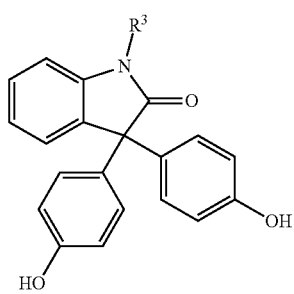

(1c')

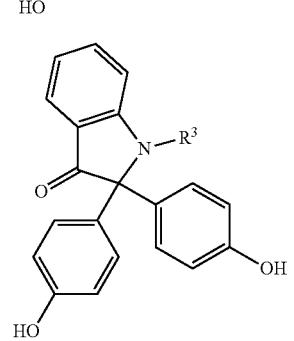

(1d')

in which $R^3$ represents $C_1$-$C_4$-alkyl, aralkyl or aryl, preferably methyl or phenyl, very particularly preferably phenyl.

The monomer unit(s) of general formula (2) is/are introduced via one or more corresponding diphenols of general formula (2a):

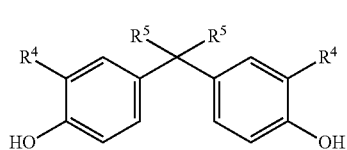

(2a)

in which $R^4$ represents H, linear or branched $C_1$-$C_{10}$-alkyl, preferably linear or branched $C_1$-$C_6$-alkyl, particularly preferably linear or branched $C_1$-$C_4$-alkyl, very particularly preferably H or $C_1$-alkyl (methyl) and in which $R^5$ represents linear or branched $C_1$-$C_{10}$-alkyl, preferably linear or branched $C_1$-$C_6$-alkyl, particularly preferably linear or branched $C_1$-$C_4$-alkyl, very particularly preferably $C_1$-alkyl (methyl).

Diphenol (2b) in particular is very particularly preferred here.

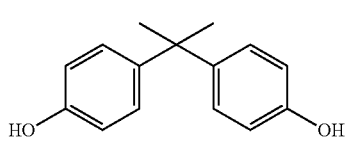

(2b)

In addition to one or more monomer units of formulae (1a), (1b), (1c) and (1d) and (2) the polycarbonates of component A may also comprise one or more monomer unit(s) of formulae (3) which are distinct from the monomer units according to formulae (1a), (1b), (1c), (1d) and (2):

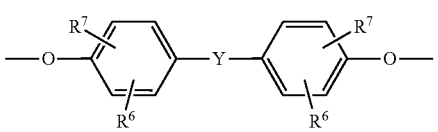

(3)

in which $R^6$ and $R^7$ independently of one another represent H, $C_1$-$C_{18}$-alkyl, $C_1$-$C_{18}$-alkoxy, halogen such as Cl or Br or respectively optionally substituted aryl or aralkyl, preferably H or $C_1$-$C_{12}$-alkyl, particularly preferably H or $C_1$-$C_8$-alkyl and very particularly preferably H or methyl, and Y represents a single bond, —$SO_2$—, —CO—, —O—, —S—, $C_1$-$C_6$-alkylene or $C_2$-$C_5$-alkylidene, furthermore $C_6$-$C_{12}$-arylene, which may optionally be fused with further heteroatom-comprising aromatic rings.

The monomer unit(s) of general formula (3) is/are introduced via one or more corresponding diphenols of general formula (3a):

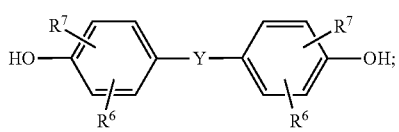

(3a)

where $R^6$, $R^7$ and Y each have the meaning stated above in connection with formula (3).

Examples of the diphenols of formula (3a) which may be employed in addition to the diphenols of formula (1a'), (1b'), (1c'), (1d') and (2) include hydroquinone, resorcinol, dihydroxybiphenyls, bis(hydroxyphenyl)alkanes distinct from formula (2a), bis(hydroxyphenyl)sulfides, bis(hydroxyphenyl) ethers, bis(hydroxyphenyl)ketones, bis(hydroxyphenyl) sulfones, bis(hydroxyphenyl)sulfoxides, α,α'-bis(hydroxyphenyl)diisopropylbenzenes and the ring-alkylated and ring-halogenated compounds thereof and also α,ω-bis (hydroxyphenyl)polysiloxanes.

The diphenols used for producing the polycarbonates according to component A are known from the literature and producible by methods known from the literature (see for example H. J. Buysch et al., Ullmann's Encyclopedia of Industrial Chemistry, VCH, New York 1991, 5th Ed., Vol. 19, p. 348).

The copolycarbonate components in component A may be present as block copolycarbonate and random copolycarbonate. Random copolycarbonates are particularly preferred.

Preferred methods of production of the homo- or copolycarbonates (also referred to jointly hereinbelow as (co) polycarbonates) preferably employed in the composition according to the invention as component A are the interfacial method and the melt transesterification process.

To obtain high molecular weight (co)polycarbonates by the interfacial method the alkali salts of diphenols are reacted with phosgene in a biphasic mixture. The molecular weight may be controlled by the amount of monophenols which act as chain terminators, for example phenol, tert-butylphenol or cumylphenol, particularly preferably phenol, tert-butylphenol. These reactions form practically exclusively linear polymers. This may be confirmed by end-group analysis. Through deliberate use of so-called branching agents, generally polyhydroxylated compounds, branched polycarbonates are also obtained.

To obtain high molecular weight (co)polycarbonates by the melt transesterification process diphenols are reacted in the melt with carbonic diesters, normally diphenyl carbonate, in the presence of catalysts, such as alkali metal salts, ammonium or phosphonium compounds.

The melt transesterification process is described for example in Encyclopedia of Polymer Science, Vol. 10 (1969), Chemistry and Physics of Polycarbonates, Polymer Reviews, H. Schnell, Vol. 9, John Wiley and Sons, Inc. (1964) and in DE-C 10 31 512.

The relative solution viscosity of component A employed in the composition according to the invention is preferably in the range of 1.20-1.28. The relative solution viscosity of component A in the context of the present application is determined in methylene chloride according to DIN 51562-1999 version.

If a mixture of different (co)polycarbonates is employed as component A the relative solution viscosity of this mixture employed as component A is preferably in this range of 1.20-1.28.

Upon use of copolycarbonates based on at least one monomer unit selected from the group characterized by general formula (1a) and at least one monomer unit selected from the group characterized by general formula (2) the relative solution viscosity of this copolymer employed in component A is preferably in the range of 1.23-1.27.

Upon use of copolycarbonates based on at least one monomer unit selected from any of groups (1b), (1c), (1d) and at least one monomer unit selected from the group characterized by general formula (2) the relative solution viscosity of this copolymer employed in component A is preferably in the range of 1.20-1.24.

Upon use of homo- or copolycarbonates based on at least one monomer unit selected from the group characterized by general formula (2) which comprise no monomer units derived from bis(4-hydroxyphenyl) compounds and bridged via the 1,1'-position of a cyclic hydrocarbon optionally substituted with heteroatoms the relative solution viscosity of this homo- or copolymer employed in component A is preferably in the range of 1.20-1.28.

Component B

Component B comprises one or more graft polymers of
B.1 10 to 70 wt %, preferably 15 to 60 wt %, particularly preferably 20 to 55 wt %, of at least one vinyl monomer
B.2 30 to 90 wt %, preferably 40 to 85 wt %, particularly preferably 45 to 80 wt %, of at least one elastomeric particulate graft base selected from the group consisting of diene rubbers and EPDM rubbers (i.e. based on ethylene/propylene and diene).

Graft base B.2 generally has a median particle size ($d_{50}$ value) of 0.05 to 1 μm, preferably 0.1 to 0.7 μm, particularly preferably 0.2 to 0.5 μm.

In preferred embodiments the proportion of rubber particles in the graft base B.2 having a diameter of <200 nm is at least 10 wt %, preferably at least 20 wt %.

Monomers B.1 are preferably mixtures of
B.1.1 50 to 99 wt %, preferably 65 to 85 wt %, preferably 70 to 80 wt %, in each case based on the sum of the monomers of the graft sheath B.1, of vinylaromatics and/or ringsubstituted vinylaromatics (such as styrene, α-methylstyrene, p-methylstyrene, p-chlorostyrene) and/ or ($C_1$-$C_8$)-alkyl (meth)acrylates, such as methyl methacrylate, ethyl methacrylate and butyl acrylate, and
B.1.2 1 to 50 wt %, preferably 15 to 35 wt %, particularly preferably 20 to 30 wt %, in each case based on the sum of the monomers of the graft sheath B.1, of vinyl cyanides (unsaturated nitriles such as acrylonitrile and methacrylonitrile) and/or ($C_1$-$C_8$)-alkyl (meth)acrylates, for example methyl methacrylate, n-butyl acrylate, t-butyl acrylate, and/or derivates (such as anhydrides and imides) of unsaturated carboxylic acids, for example maleic anhydride and N-phenylmaleimide.

Preferred monomers B.1.1 are selected from at least one of the monomers styrene, α-methylstyrene and methyl methacrylate. Preferred monomers B.1.2 are selected from at least one of the monomers acrylonitrile, maleic anhydride and methyl methacrylate. Particularly preferred monomers are B.1.1 styrene and B.1.2 acrylonitrile.

Preferred graft bases B.2 are diene rubbers (for example based on butadiene and/or isoprene) or mixtures of diene rubbers. Diene rubbers in the context of the invention are to be understood as also encompassing diene-monomer-containing copolymers comprising copolymerizable monomers (for example according to B.1.1 and B.1.2) These may be both random copolymers and copolymers having a block structure.

The graft bases B.2 preferably have a glass transition temperature of <0° C., particularly preferably <−40° C., very particularly preferably <−70° C.

Particularly preferred polymers B are for example ABS polymers, in particular those produced in the emulsion polymerization process as described for example in Ullmanns, Enzyklopädie der Technischen Chemie, vol. 19 (1980), p. 280 et seq.

Since, as is well known, the graft monomers are not necessarily entirely grafted onto the graft base in the grafting reaction, according to the invention graft polymers B are to be understood as also encompassing products generated by (co)polymerization of the graft monomers B.1 in the presence of the graft base B.2 and coobtained in the workup. These products may also comprise free, i.e. not covalently bonded to the graft base B.2, vinyl (co)polymer from B.1.1 and B.1.2.

The gel content of the graft polymers B, measured in acetone as solvent, is preferably at least 70 wt %, particularly preferably at least 75 wt %, very particularly preferably at least 80 wt %. Thus the proportion y calculated according to y=100%−gel fraction is a measure of the free, i.e. not covalently bonded to the graft base, vinyl (co)polymer from B.1.1 and B.1.2.

It is preferable when the graft polymer of components B.1 and B.2 has a core-shell structure, wherein component B.1 forms the shell (also described as sheath) and component B.2 forms the core; (see by way of example Ullmann's Encyclopedia of Industrial Chemistry, VCH-Verlag, Vol. A21, 1992, p. 635 and p. 656).

The graft copolymers B are produced by free radical polymerization.

The gel content of the graft polymers B is determined at 25° C. in a suitable solvent, preferably in acetone (M. Hoffmann, H. Krömer, R. Kuhn, Polymeranalytik I und II, Georg Thieme-Verlag, Stuttgart 1977).

The median particle size $d_{50}$ is the diameter with 50 wt % of the particles above it and 50 wt % below it. It is determined by ultracentrifuge measurement (W. Scholtan, H. Lange, Kolloid, Z. und Z. Polymere 250 (1972), 782-796). This method is used in the context of the present application to determine the rubber particle size distribution. The proportion of rubber particles in the graft base B.2 having a diameter of <200 nm may also be determined therefrom.

The glass transition temperature in the context of the present application is determined by differential scanning calorimetry (DSC) in accordance with the standard DIN EN 61006 at a heating rate of 10 K/min where $T_g$ is defined as the midpoint temperature (tangent method).

Component C

The composition may comprise as component C one or more further additives preferably selected from the group consisting of flame retardants (for example organic phosphorus or halogen compounds, in particular bisphenol-A-based oligophosphate), anti-drip agents (for example compounds from the classes of fluorinated polyolefins, silicones, and also aramid fibres), flame retardant synergists (for example nanoscale metal oxides), smoke inhibitors (for example zinc borate), lubricants and demolding agents (for example pentaerythritol tetrastearate), nucleating agents, antistats, conductivity additives, stabilizers (e.g. hydrolysis, heat-aging and UV stabilizers, and also transesterification inhibitors and acid/base quenchers), flow promoters, compatibilizers, further impact modifiers distinct from component B (with or without core-shell structure), further polymeric constituents (for example functional blend partners), fillers and reinforcers (for example carbon fibers, talc, mica, kaolin, $CaCO_3$) and also dyes and pigments (for example titanium dioxide or iron oxide).

In preferred embodiments the composition is free from flame retardants, anti-drip agents, flame retardant synergists and smoke inhibitors.

In likewise preferred embodiments the composition is free from fillers and reinforcers.

In particularly preferred embodiments the composition is free from flame retardants, anti-drip agents, flame retardant synergists, smoke inhibitors and fillers and reinforcers.

In preferred embodiments the composition comprises at least one polymer additive selected from the group consisting of lubricants and demolding agents, stabilizers, flow promoters, compatibilizers, further impact modifiers distinct from component B, further polymeric constituents, dyes and pigments.

In preferred embodiments component C comprises no free (i.e. not chemically bonded to a rubber base) vinyl (co) polymer.

In particularly preferred embodiments the composition comprises at least one polymer additive selected from the group consisting of lubricants and demolding agents, stabilizers, flow promoters, compatibilizers, further impact modifiers distinct from component B, further polymeric constituents, dyes and pigments and is free from further polymer additives.

In preferred embodiments the composition comprises at least one polymer additive selected from the group consisting of lubricants/demolding agents and stabilizers.

In particularly preferred embodiments the composition comprises at least one polymer additive selected from the group consisting of lubricants/demolding agents and stabilizers and is free from further polymer additives.

In preferred embodiments the composition comprises pentaerythritol tetrastearate as a demolding agent.

In preferred embodiments the composition comprises as a stabilizer at least one representative selected from the group consisting of sterically hindered phenols, organic phosphites, sulfur-based co-stabilizers and organic or inorganic Brønsted acids.

In particularly preferred embodiments the composition comprises as a stabilizer at least one representative selected from the group consisting of octadecyl 3-(3,5-di-tert-butyl-4-hydroxyphenyl)propionate and tris(2,4-di-tert-butylphenyl)phosphite.

In especially preferred embodiments the composition comprises as a stabilizer a combination of octadecyl 3-(3, 5-di-tert-butyl-4-hydroxyphenyl)propionate and tris(2,4-di-tertbutylphenyl)phosphite.

Particularly preferred compositions comprise pentaerythritol tetrastearate as a demolding agent, at least one representative selected from the group consisting of octadecyl 3-(3,5-di-tert-butyl-4-hydroxyphenyl)propionate and tris(2, 4-di-tert-butylphenyl)phosphite as a stabilizer and optionally a Brønsted acid and are free from further polymer additives.

More preferred compositions comprise pentaerythritol tetrastearate as a demolding agent, a combination of octadecyl 3-(3,5-di-tert-butyl-4-hydroxyphenyl)propionate and tris(2,4-di-tertbutylphenyl)phosphite as a stabilizer, optionally a Brønsted acid and are free from further polymer additives.

Production of the Molding Materials

The thermoplastic molding materials according to the invention can be produced for example by mixing the respective constituents and melt compounding and melt extruding the resulting mixture at temperatures of 220° C. to 350° C., preferably at 250 to 330° C., particularly preferably at 260° C. to 320° C., in customary aggregates such as internal kneaders, extruders and twin-shaft screw systems, in known fashion.

The mixing of the individual constituents may be effected in known fashion, either successively or simultaneously, either at about 20° C. (room temperature) or at a higher temperature.

In a preferred embodiment production of the compositions according to the invention is effected in a twin-shaft extruder.

Use of the Molding Materials for Producing Galvanized Moldings

The production of the galvanized moldings may be effected for example via a process, characterized in that
(i) in a first step a plastics carrier made of a polycarbonate composition according to the invention as described above is formed, wherein preferably an extrusion, blow molding, thermoforming or injection molding process, particularly preferably an injection molding process, is used for forming in the production of this carrier,
(ii) and in a second process step this plastics carrier is galvanized in a galvanizing process established for acrylonitrile-butadiene-styrene (ABS) copolymers and blends thereof with polycarbonate.

Process step (ii) of galvanizing essentially comprises the following individual steps:
(ii-1) pickling of the plastics carrier produced in process step (i), for example and preferably with chromosulfuric acid, wherein in preferred embodiments in this process step a wetting aid (for example Udique® Wetting Agent BL2030 from Entone) is employed as a process auxiliary which reduces the surface tension between the plastics carrier and the pickling agent, followed by a chemical reduction of the chromosulfuric acid using a reducing agent such as for example iron (II) chloride and subsequent thorough rinsing with water for effective removal of chromium residues,
(ii-2) activation of the thus pretreated plastics carrier by adsorption of a palladium colloid, preferably a palladium colloid having a tin chloride sheath, onto the carrier surface,
(ii-3) generation of palladium seeds for later deposition of chemical nickel or chemical copper on the plastics carrier surface by destruction of the sheath of the adsorbed palladium colloid by treatment with a diluted Brønsted acid,
(ii-4) deposition of chemical nickel or chemical copper on the thus pretreated plastics carrier from a nickel (II) or a copper (II) salt solution using a chemical reducing agent, for example a dihydrogenphosphite salt,
(ii-5) electrochemical application of a copper metal layer,
(ii-6) electrochemical application of a nickel metal layer, and
(ii-7) electrochemical application of a further metal layer having a high resistance to environmental influences, for example and preferably a chromium metal layer.

EXAMPLES

Component A1:
Linear polycarbonate based on bisphenol A having a weight-average molecular weight $M_W$ of 25 000 g/mol (determined by GPC against a BPA-PC standard) and a relative solution viscosity of 1.255.

Component A2:
Linear polycarbonate based on bisphenol A having a weight-average molecular weight $M_W$ of 18 000 g/mol (determined by GPC against a BPA-PC standard) and a relative solution viscosity of 1.20.

Component A3:
Linear polycarbonate based on a mixture of 89 wt % of bisphenol A and 11 wt % of bisphenol TMC (1,1'-bis(4-hydroxyphenyl)-3,3',5-trimethylcyclohexane) having a weight-average molecular weight $M_W$ of 25 000 g/mol (determined by GPC against a BPA-PC standard) and a relative solution viscosity of 1.255.

Component A4:
Linear polycarbonate based on a mixture of 55 wt % of bisphenol A and 45 wt % of bisphenol TMC (1,1'-bis(4-hydroxyphenyl)-3,3',5-trimethylcyclohexane) having a weight-average molecular weight $M_W$ of 28 000 g/mol (determined by GPC against a BPA-PC standard) and a relative solution viscosity of 1.255.

Component A5:
Linear polycarbonate based on a mixture of 32 wt % of bisphenol A and 68 wt % of bisphenol TMC (1,1'-bis(4-hydroxyphenyl)-3,3',5-trimethylcyclohexane) having a weight-average molecular weight $M_W$ of 29 000 g/mol (determined by GPC against a BPA-PC standard) and a relative solution viscosity of 1.255.

Component A6:
Linear polycarbonate based on a mixture of 64 wt % of bisphenol A and 36 wt % of 2-phenyl-3,3'-bis(4-hydroxyphenyl)phthalimide (PPPBP) having a weight-average molecular weight $M_W$ of 22 500 g/mol (determined by GPC against a BPA-PC standard) and a relative solution viscosity of 1.215.

Component B-1:
ABS graft polymer based on a polybutadiene rubber as the graft base having an acrylonitrile:butadiene:styrene ratio of 13:50:37 wt % and having a gel content, measured in acetone, of 80 wt %, produced in emulsion polymerization. The median particle size $d_{50}$ of the rubber base is 0.4 µm and 30 wt % of the rubber particles used as the graft base for producing this ABS graft polymer have a particle diameter of less than 200 nm, measured by ultracentrifugation in each case.

Component B-2:
ABS graft polymer based on a polybutadiene rubber as the graft base having an acrylonitrile:butadiene:styrene ratio of 11:59:30 wt % and having a gel content, measured in acetone, of 90 wt %, produced in emulsion polymerization. The median particle size $d_{50}$ of the rubber base is 0.4 µm and 0.4 wt % of the rubber particles used as the graft base for producing this ABS graft polymer have a particle diameter of less than 200 nm, measured by ultracentrifugation in each case, i.e. all rubber particles are larger than 200 nm.

Component C-1:
SAN copolymer having an acrylonitrile content of 23 wt % and a weight-average molecular weight of 130 000 g/mol (determined by GPC against a polystyrene standard).

Component D-1: pentaerythritol tetrastearate
Component D-2: Phosphite stabilizer Irgafos 168 (BASF, Ludwigshafen, Germany)
Component D-3: Phenolic antioxidant Irganox 1076 (BASF, Ludwigshafen, Germany)
Component D-4: Calcium dihydrogenphosphate Production and Testing of the Molding Materials of the Invention The mixing of the components was effected in a Coperion, Werner & Pfleiderer ZSK-25 twin-shaft extruder at a melt temperature of 270 to 300° C., a throughput of 20 kg/h and a speed of 220 to 300 min$^{-1}$. The temperatures of the melt of the compositions measured at the nozzle outlet were 270 to 350° C.—depending on the viscosity of the composition, the melt temperature increasing with increasing viscosity. The molded articles were produced at a melt temperature of 280° C. and a mold temperature of 80° C. on an Arburg 270 E injection molding machine.

The IZOD notched impact strengths $a_k$ were determined at room temperature (23° C.) according to ISO 180/1A (1982 version) on test bars having dimensions of 80 mm×10 mm×4 mm.

The heat distortion temperatures according to the Vicat B/120 and H DT/A methods were both likewise determined on test bars having dimensions of 80 mm×10 mm×4 mm according to ISO 306 (50 N; 120° C./h) (2013 version) and ISO 75 (1.80 MPa) (2013 version) respectively.

The melt volume flow rates MVR were determined according to ISO 1133 (2012 version) at a temperature of 320° C. and with a ram loading of 1.2 kg The melt viscosities were determined according to ISO 11443 (2014 version) at 260/300° C. at a shear rate of 1000 s⁻ in both cases.

Galvanizability was evaluated with reference to completeness of metal coverage achieved in a galvanizing process customary for ABS+PC compositions and the appearance of blister-shaped metal detachments directly after performing the galvanizing process. An evaluation of "OK" describes a result of visually complete metal coverage on the entire molding surface without any coverage gaps or any blister formation. Galvanizability was tested on sheets having dimensions of 150 mm×100 mm×2 mm which were produced in the injection molding process under the abovementioned conditions.

Galvanizing was effected as follows: The plastics carrier produced by injection molding was initially pickled with chromosulfuric acid (390 g/liter of chromic acid and 390 g/liter of conc. sulfuric acid) for 18 minutes at 68° C. This was followed by rinsing with water. Remaining chromosulfuric acid residues were then reduced with Adhemax® Neutralizer CR for one minute at 35° C., the thus treated molding was again rinsed with water and then treated with Neolink® H (produced by Atotech) as conditioner for 3 minutes at 35° C. The thus pretreated plastic carrier was activated by adsorption of a palladium colloid having a tin chloride sheath (Adhemax® Aktivator SF, produced by Atotech). Activation was effected at 35° C. and an activation time of 4 min. The concentration of palladium in the aqueous activation solution was 50 mg Pd/liter. The colloid was destroyed by subsequent treatment with Adhemax® accelerator ACC1 (produced by Atotech) for 4 minutes at 40° C., thus forming palladium seeds. This was followed by deposition of chemical nickel from Adhemax® LSF for 9 minutes at 40° C. The component part was subsequently immersed in sulfuric acid for 30 seconds at room temperature. Then, initially a copper metal layer, followed by a nickel metal layer and in turn followed by a chromium metal layer were electrochemically applied.

To determine adhesion of the metal layer to the plastics carrier the abovedescribed process was repeated and aborted after electrochemical application of the copper metal layer.

The thickness of the applied copper metal layer was on average 30 µm.

The adhesion of the metal layer to the plastics carrier was determined in a roller peel test according to DIN 53494 (1989 version). To this end test specimens having a length of 80 mm and a width (in a departure from the standard) of 10 mm were cut out of the abovedescribed sheets. The pulloff speed was 50 mm/min. The measured pulloff force was normalized over the specimen width (measured value in N/mm) and—neglecting the first and last 10 mm of the pulloff path—averaged over the entire pulloff sector. The reported measured values are averages from five measurements.

To determine the palladium coverage achieved in the activation step of the galvanizing process the abovedescribed galvanizing process was repeated but aborted after destruction of the palladium colloid. The thus pretreated sheets were treated with a mixture of one part per volume of aqua regia and one part by volume of DM water and in this way the palladium seeds were fully dissolved. After suitable dilution the palladium content of this solution was determined by inductively coupled plasma optical emission spectroscopy (ICP-OES).

The heat resistance of the galvanized molding (sheets having dimensions of 150 mm×100 mm×2 mm) is the maximum temperature (varied in steps of 5° C.) at which after two hours of storage immediately after removal of the component part from the oven and cooling to room temperature no distortion and no detachment of the metal layer (for example in the form of blister formation) was observed.

TABLE 1

| Compositions and properties thereof | | | | | | | | | |
|---|---|---|---|---|---|---|---|---|---|
| | CE1 | 2 | 3 | CE4 | CE5 | 6 | 7 | 8 | 9 |
| Components [parts by weight] | | | | | | | | | |
| A-1 | 85 | | | | | | | | |
| A-2 | | | | | | | 21.25 | 20 | |
| A-3 | | 85 | 42.5 | | | | | | 80 |
| A-4 | | | 42.5 | 85 | | | 63.75 | 60 | |
| A-5 | | | | | 85 | | | | |
| A-6 | | | | | | 85 | | | |
| B-1 | 15 | 15 | 15 | 15 | 15 | 15 | 15 | 20 | 20 |
| B-2 | | | | | | | | | |
| C-1 | | | | | | | | | |
| D-1 | 0.4 | 0.4 | 0.4 | 0.4 | 0.4 | 0.4 | 0.4 | 0.4 | 0.4 |
| D-2 | 0.02 | 0.02 | 0.02 | 0.02 | 0.02 | 0.02 | 0.02 | 0.02 | 0.02 |
| D-3 | 0.28 | 0.28 | 0.28 | 0.28 | 0.28 | 0.28 | 0.28 | 0.28 | 0.28 |
| D-4 | 0.004 | 0.004 | 0.004 | 0.004 | 0.004 | 0.004 | 0.004 | 0.004 | 0.004 |
| Formulation characteristics | | | | | | | | | |
| K [wt %] | 7.5 | 7.5 | 7.5 | 7.5 | 7.5 | 7.5 | 7.5 | 10.0 | 10.0 |
| S [wt %] | 3.0 | 3.0 | 3.0 | 3.0 | 3.0 | 3.0 | 3.0 | 4.0 | 4.0 |
| K/S | 2.5 | 2.5 | 2.5 | 2.5 | 2.5 | 2.5 | 2.5 | 2.5 | 2.5 |
| $A_{cyc}$ [wt %] | 0 | 11 | 28 | 45 | 68 | 36 | 34 | 34 | 11 |

TABLE 1-continued

Compositions and properties thereof

Properties

| | | | | | | | | | |
|---|---|---|---|---|---|---|---|---|---|
| ak [kJ/m2] | 47 (d) | 45 (d) | 37 (d) | 28 (s) | 18s (s) | 23 (s) | 31 (d) | 31 (d) | 42 (d) |
| Vicat B120 [° C.] | 140 | 147 | 158 | 171 | 190 | 173 | 162 | 159 | 144 |
| HDT/A [° C.] | 116 | 119 | 129 | 143 | 160 | 146 | 136 | 131 | 116 |
| MVR [ml/10 min] | 7.6 | 8.6 | 5.5 | 3.6 | 2.1 | 5.0 | 6.5 | 3.8 | 5.7 |
| Viscosity at 260° C. [Pas] | 476 | 597 | | | | | | | 530 |
| Viscosity at 300° C. [Pas] | | 254 | 323 | 418 | 641 | 375 | 302 | 281 | 237 |
| Pd [mg/m²] | n.m. | 5.8 | 5.6 | 5.5 | 4.8 | 6.5 | 4.8 | 6.0 | 8.8 |
| Galvanizing | OK | OK | OK | OK | OK | OK | OK | OK | OK |
| Adhesion [N/mm] | n.m. | 0.31 | 0.20 | 0.13 | 0.07 | 0.39 | 0.21 | 0.39 | 0.46 |
| Heat resistance [° C.] | 130 | 140 | 150 | 155 | 150 | 150 | n.m. | 150 | 140 |

| | 10 | CE11 | CE12 | CE13 | CE14 | CE15 | 16 | CE17 |
|---|---|---|---|---|---|---|---|---|
| Components [parts by weight] | | | | | | | | |
| A-1 | | | | | | | | 80 |
| A-2 | | | | | | | | |
| A-3 | 70 | 60 | 80 | 80 | 80 | 80 | 80 | |
| A-4 | | | | | | | | |
| A-5 | | | | | | | | |
| A-6 | | | | | | | | |
| B-1 | 30 | 40 | 15 | 10 | 7 | 4 | | 20 |
| B-2 | | | | | | | 17 | |
| C-1 | | | 5 | 10 | 13 | 16 | 3 | |
| D-1 | 0.4 | 0.4 | 0.4 | 0.4 | 0.4 | 0.4 | 0.4 | 0.4 |
| D-2 | 0.02 | 0.02 | 0.02 | 0.02 | 0.02 | 0.02 | 0.02 | 0.02 |
| D-3 | 0.28 | 0.28 | 0.28 | 0.28 | 0.28 | 0.28 | 0.28 | 0.28 |
| D-4 | 0.004 | 0.004 | 0.004 | 0.004 | 0.004 | 0.004 | 0.004 | 0.004 |
| Formulation characteristics | | | | | | | | |
| K [wt %] | 15.0 | 20.0 | 7.5 | 5.0 | 3.5 | 2.0 | 10.0 | 10.0 |
| S [wt %] | 6.0 | 8.0 | 8.0 | 12.0 | 14.4 | 16.8 | 4.7 | 4.0 |
| K/S | 2.5 | 2.5 | 0.9 | 0.4 | 0.2 | 0.1 | 2.1 | 2.5 |
| $A_{cyc}$ [wt %] | 11 | 11 | 11 | 11 | 11 | 11 | 11 | 0 |
| Properties | | | | | | | | |
| ak [kJ/m2] | 37 (d) | 33 (d) | 44 (d) | 46 (d) | 46 (d) | 28 (s) | 43 (d) | 44 (d) |
| Vicat B120 [° C.] | 136 | 126 | 143 | 143 | 143 | 143 | 142 | 139 |
| HDT/A [° C.] | | | | | | | | 113 |
| MVR [ml/10 min] | 3.9 | 1.9 | 13.6 | 21.7 | 25.8 | 31.0 | 6.7 | 7.8 |
| Viscosity at 260° C. [Pas] | 472 | 439 | 409 | 324 | 294 | 267 | 514 | 448 |
| Viscosity at 300° C. [Pas] | | | | | | | | |
| Pd [mg/m²] | 16.5 | 25.0 | 7.0 | 6.9 | 5.6 | 5.4 | 12.0 | n.m. |
| Galvanizing | OK | OK | OK | Blisters | Blisters | Blisters | OK | OK |
| Adhesion [N/mm] | 0.42 | 0.48 | 0.16 | 0.09 | 0.04 | 0.04 | 0.30 | n.m. |
| Heat resistance [° C.] | 150 | 140 | <115 | n.m. | n.m. | n.m. | 145 | 130 | n.m.: not measured

The examples show that the inventive compositions 2, 3, 6 to 8, 10, 11 and 17 achieve the object of the invention while the comparative examples depart from the target profile of properties in the at least one property.

The compositions according to comparative examples CE1 and CE17 which do not employ any polycarbonate comprising monomer units derived from bis(4-hydroxyphenyl) compounds and bridged via the 1,1'-position of a cyclic hydrocarbon optionally substituted with heteroatoms result in the galvanized component parts in an insufficient heat resistance.

In the compositions according to comparative examples CE4 and CE5 which by contrast employ polycarbonate having an excessively high content of monomer units derived from bis(4-hydroxyphenyl) compounds and bridged via the 1,1'-position of a cyclic hydrocarbon optionally substituted with heteroatoms, inadequate adhesion of the metal layer to the plastics carrier and disadvantageous material toughness results.

The composition according to comparative example C11 having too low a content of polycarbonate exhibits an insufficient heat distortion resistance (Vicat B 120).

The composition according to comparative example CE12 employs the same polycarbonate component as the inventive composition 2 and also has the same rubber content. However, compared to composition 2 which has a lower content of free vinyl copolymer S and thus a higher ratio of K/S it shows an insufficient adhesion of the metal layer to the plastics carrier. The same applies to the comparative examples CE13 to CE15 having a further reduced ratio K/S.

The invention claimed is:

1. An article consisting of a plastics carrier and a multi-ply metal layer applied via a galvanizing process, wherein the plastics carrier is produced from a composition consisting of
A) 70 to 90 parts by weight of at least one polycarbonate,
B) 10 to 30 parts by weight of at least one graft polymer comprising a diene-containing elastomeric particulate graft base and a vinyl (co)polymer sheath,
C) 0 to 15 parts by weight of at least one additive,
wherein the sum of the parts by weight of components A) and B) in the composition is normalized to 100,
(i) characterized in that the rubber content from component B in the composition is at least 6 wt %,
(ii) characterized in that the ratio K/S of the weight fractions of diene-containing elastomeric particulate graft base from component B) in the composition (=K) to the sum of free vinyl (co)polymer from component B) and any free vinyl (co)polymer from component C) in the composition (=S) is at least 1.5,
(iii) characterized in that component A) comprises at least one monomer unit selected from the group consisting of monomer units described by general formula (2)

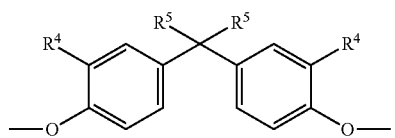

(2)

in which
$R^4$ represents H, linear or branched $C_1$-$C_{10}$ alkyl, and
$R^5$ represents linear or branched $C_1$-$C_{10}$ alkyl, and at least one monomer unit derived from 1,1-bis(4-hydroxyphenyl)-3,3',5-trimethylcyclohexane,
(iv) characterized in that the proportion ($A_{cyc}$) of monomer units derived from bis(4-hydroxyphenyl) compounds and bridged via the 1,1'-position of a cyclic hydrocarbon optionally substituted with heteroatoms based on the sum of all monomer units derived from bisphenols in component A) is in the range from 5 to 40 wt % and
(v) characterized in that component A) has a relative solution viscosity of 1.20 to 1.28 determined according to DIN 51562 in methylene chloride.

2. The article as claimed in claim 1, consisting of
A) 80 to 85 parts by weight of at least one aromatic polycarbonate,
B) 15 to 20 parts by weight of at least one graft polymer comprising a diene-containing elastomeric particulate graft base and a vinyl (co)polymer sheath,
C) 0.2 to 3 parts by weight of at least one additive,
wherein the sum of the parts by weight of components A) and B) in the composition is normalized to 100.

3. The article as claimed in claim 1, wherein component C one or more additives is selected from the group consisting of flame retardants, anti-drip agents, flame retardant synergists, smoke inhibitors, lubricants and demolding agents, nucleating agents, antistats, conductivity additives, stabilizers, flow promoters, compatibilizers, further impact modifiers distinct from component B, polymeric constituents, fillers, reinforcers, dyes and pigments.

4. The article as claimed in claim 1, characterized in that the rubber content from component B in the composition is at least 9 wt %.

5. The article as claimed in claim 1, characterized in that the ratio K/S is at least 2.1.

6. The article as claimed in claim 1, characterized in that $A_{cyc}$ is between 10 and 35 wt %.

7. The article as claimed in claim 1, characterized in that the relative solution viscosity of component A is in the range from 1.22 to 1.26.

8. The article as claimed in claim 1, wherein if homo- or copolycarbonates based on at least one monomer unit selected from the group characterized by general formula (2) which comprise no monomer units derived from bis(4-hydroxyphenyl) compounds and bridged via the 1,1'-position of a cyclic hydrocarbon optionally substituted with heteroatoms are present, the relative solution viscosity of this homo- or copolymer employed in component A is in the range of 1.20-1.28.

9. The article as claimed in claim 1, characterized in that the proportion of rubber particles in the diene-containing elastomeric particulate graft base having a diameter of <200 nm is at least 20 wt %.

10. The article according to claim 1, wherein:
$R^4$ represents H or linear or branched $C_1$-$C_6$ alkyl; and
$R^5$ represents linear or branched $C_1$-$C_6$ alkyl.

11. The article according to claim 1, wherein:
$R^4$ represents H or linear or branched $C_1$-$C_4$ alkyl;
$R^5$ represents linear or branched $C_1$-$C_4$ alkyl.

12. The article according to claim 1, wherein:
$R^4$ represents H or $C_1$-alkyl (methyl); and
$R^5$ represents $C_1$-alkyl (methyl).

13. The article according to claim 1, wherein the composition has a Vicat B/120 heat distortion resistance according to ISO 306-2013 version of at least 135° C.

14. The article according to claim 1, wherein the composition has a notched impact strength measured according to ISO 180/1A-1982 version at room temperature of at least 20 kJ/m².

15. The article according to claim 1, wherein the plastics carrier galvanized to the multi-ply metal layer has an adhesion to the multi-ply metal layer of at least 0.20 N/mm measured in the roller peel test according to DIN 53494 (1984 version).

* * * * *